March 2, 1965
A. B. SHARP
3,171,558
FEED BODY MOTOR MOUNT
Filed Sept. 9, 1963
2 Sheets-Sheet 1
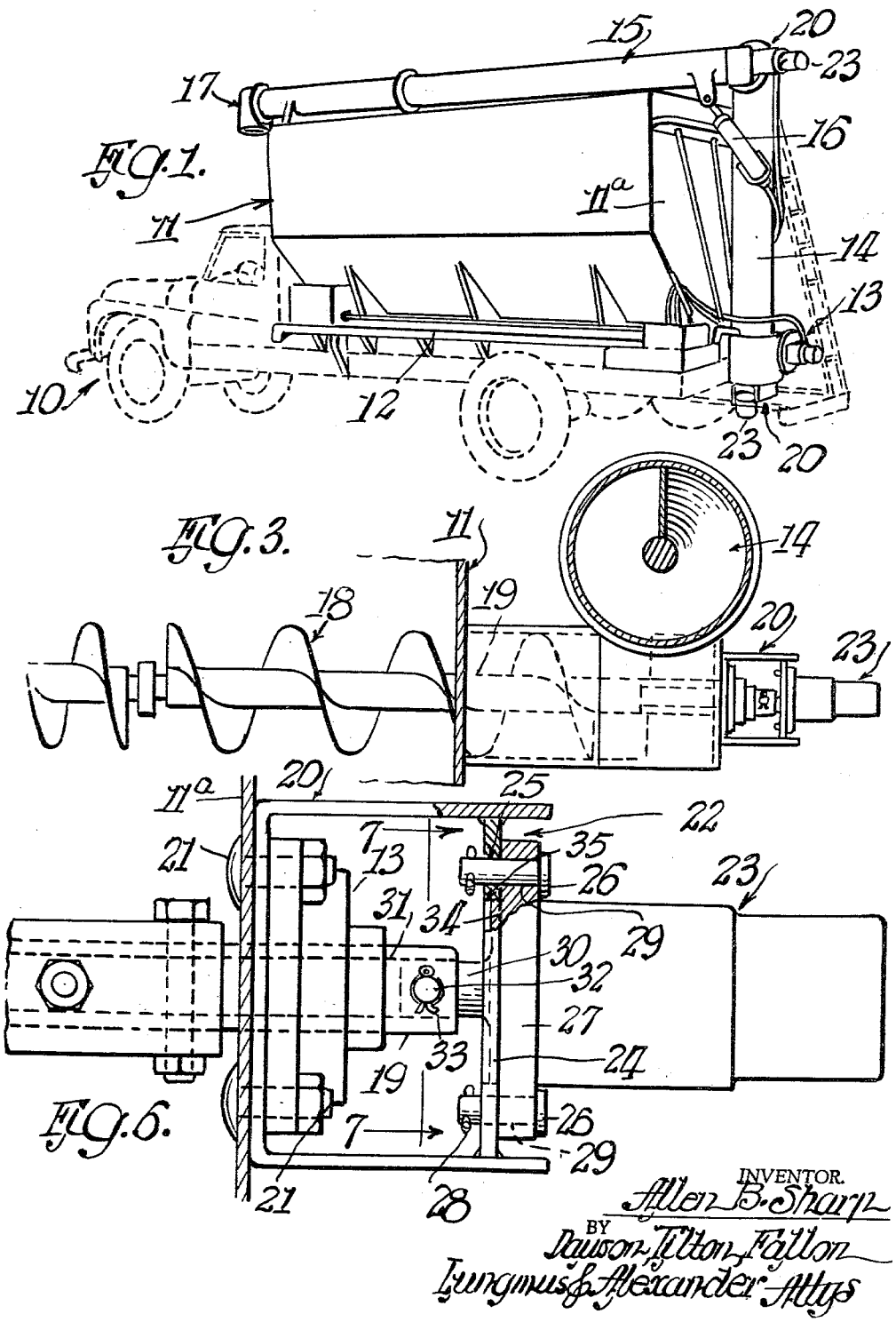
INVENTOR.
Allen B. Sharp
BY
Dawson, Tilton, Fallon
Lungmus & Alexander Attys March 2, 1965 A. B. SHARP 3,171,558
FEED BODY MOTOR MOUNT
Filed Sept. 9, 1963 2 Sheets-Sheet 2
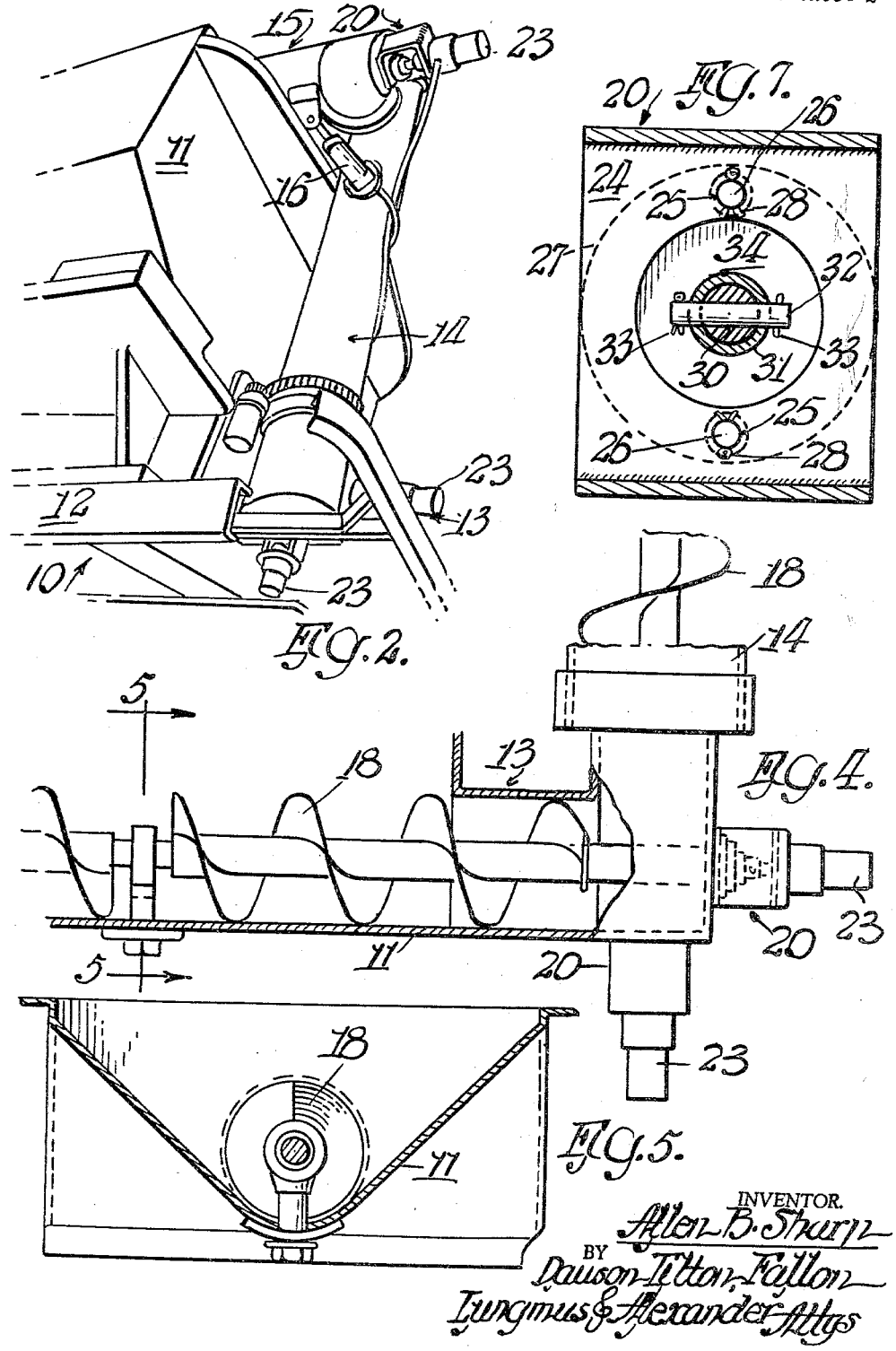
INVENTOR.
Allen B. Sharp
BY Dawson, Tilton, Fallon,
Lungmus & Alexander Attys 3,171,558
FEED BODY MOTOR MOUNT
Allen B. Sharp, Ottumwa, Iowa, assignor to Highway Equipment Company, Cedar Rapids, Iowa, a corporation of Iowa
Filed Sept. 9, 1963, Ser. No. 307,656
4 Claims. (Cl. 214—522)

This invention relates to a feed body motor, mount, and, more particularly, to means for driving an auger associated with a self-unloading bulk feed body.

In the unloading of bulk material from hopper-like bodies, augers have been widely used in the past and generally have been driven through special drives interconnecting the prime mover with the auger. This has provided a problem, since dust from the unloaded material can interfere with the operation of the drive and cause undue maintenance and, on occasion, premature failure. Failure on the part of the unloading mechanism is disadvantageous, especially if it occurs during the midst of the unloading of a sizable quantity of material.

It is, therefore, a general object of this invention to provide a novel drive for the auger in these and similar installations wherein the drive includes a uniquely mounted motor characterized by minimum maintenance.

Other objects and advantages of the invention may be seen in the details of construction and operation set down in this specification.

The invention is described in conjunction with an illustrative embodiment in the accompanying drawing, in which—

FIG. 1 is a perspective view of a typical mobile bulk feed body equipped with the invention;

FIG. 2 is a fragmentary perspective view of the extreme rear portion of FIG. 1 and showing portions of the apparatus in enlarged scale;

FIG. 3 is a fragmentary top plan view of one of the the augers and its drive seen in FIGS. 1 and 2;

FIG. 4 is a side elevational view of the apparatus seen in FIG. 3;

FIG. 5 is a rear end elevational view of the apparatus seen in FIGS. 3 and 4 and in enlarged scale;

FIG. 6 is a fragmentary side elevational view of the portion of the apapratus seen in FIG. 5; and FIG. 7 is a detail vertical sectional view through a part of the apparatus as taken on the line 7—7 of FIG. 6.

In the illustration given, and with particular reference to FIG. 1, the numeral 10 designates generally a truck equipped with an elongated hopper generally designated 11. The hopper 11 is seen to be equipped with a frame 12 which provides means for interconnecting the hopper 11 with the truck 10. Projecting from the rear of the hopper and immediately adjacent the bottom thereof, is a first auger casing 13, also seen in FIGS. 3–6.

Coupled to the first auger casing 13 for removal of bulk feed material therefrom is a second auger casing 14 which is seen to be vertically disposed at the rear of the truck 10. A third auger casing 15 is seen to be coupled to the top of the second auger casing 14 and, by virtue of the hydraulic ram 16, is adapted to be swung through a substantial vertical arc so as to discharge bulk material from the hopper 11 through the spout 17 at the forward end of the third auger casing 15.

Each of the auger casings 13–15 is equipped with an auger of the character generally designated 18 in FIG. 3, which is seen to include a shaft extension 19. It will be appreciated that feed bodies of this general nature have been used before and that the foregoing description has been given for the sake of illustrating a preferred environment for the inventive auger drive.

Reference to FIG. 6 reveals that a bracket generally designated 20 is rigidly secured by means of bolts 21 to the rear wall 11a of the hopper 11. It will be appreciated that in the case of the second and third auger casings 14 and 15 this connection is made to the end wall of the casings as at 22 in confronting relation with a motor generally designated 23. Provided within the open end 22 of the bracket 20 is a plate-like ring 24 which is equipped with openings as at 25 for the receipt of shear pins 26. The motor 23 is equipped with a base flange 27 through which the shear pin 26 extends so as to anchor the motor 23 to the bracket 20. Suitable cotterpins 28 are installed on the shear pins 26 to prevent the shear pins 26 from sliding out of the aligned openings 25 and 29, the openings 29 being provided in the flange 27, as best appears in FIGS. 6 and 7, respectively.

Additionally, the motor 23 is equipped with an output shaft 30 which is received within an axial bore 31 of the auger shaft extension 19, being secured therein by means of a shear pin 32 equipped with a suitable cotterpin 33.

Additionally, the motor 23 is equipped with a pilot boss or projection 34 which is loosely received within the central opening 35 of the ring 24.

In practice, I install the cotterpin 28 in such a position on the shear pin 26 as to provide about $1/16''$ sliding longitudinal movement in the pin 26. The openings 25 in the plate-like ring 24 provide about a $1/32''$ clearance or tolerance about the shear pin 26 so that the motor 23 during operation is adapted to move slightly in 3 degrees of movement so as to compensate for deflection in the auger 18.

I also provide about a $1/64''$ clearance about the shear pin 32 and about a $1/32''$ clearance between the motor shaft 30 and the axial bore 31 in the extending shaft 19.

The above-mentioned tolerances or clearances provide, in effect, a loose coupling between the motor 23 and the bracket 20 so that the motor literally vibrates during operation. Notwithstanding this vibration, there is provided an advantageous motor mounting which resists wear on the drive interconnection which would otherwise be present due to normal loadings on the auger 19. Advantageous for use as the motor 23 is the high torque low-speed hydraulic type motor seen in U.S. Patent No. 2,821,171, which employs inner and outer toothed members wherein the inner member develops a hypocycloidal movement.

In general, the looseness of the couplings previously mentioned are advantageously of the range of $1/64''-1/8''$, depending upon the physical dimensions of the various parts.

While in the foregoing specification a detailed description of an embodiment of the invention has been set down for the purpose of illustration, many variations in the details herein given may be made by those skilled in the art without departing from the spirit and scope of the invention.

I claim:
1. A self-unloading bulk feed body, comprising a frame adapted to be mounted on a truck and including an elongated hopper body, an auger mounted in the bottom of said hopper body for removing bulk material horizontally therefrom, said auger projecting beyond the end of said body, a casing secured to said frame confining the projecting portion of said auger and equipped with means for discharging feed material removed from said hopper body by said auger, drive means for said auger including an auger shaft extending beyond said casing, a motor mounting bracket secured to said casing about said extending shaft, and a hydraulic motor having a slow speed, high torque output shaft axially aligned with said extending shaft, said motor being loosely coupled only at one end thereof to said bracket and said output shaft being loosely coupled only at one end thereof to said ex- tending shaft, whereby said motor is adapted to shift its position relative to said bracket and auger to compensate for auger deflection.

2. The structure of claim 1 in which said discharging means includes a generally vertically disposed, elongated casing equipped with an auger and coupled to the first-mentioned casing, said vertical casing being equipped with drive means similar to the auger in said first-mentioned casing, a third casing coupled to said vertical casing and equipped with auger and drive means therefor similar to the auger and drive means in the first- and second-mentioned casings, and means on said frame for pivoting said third casing through a vertical arc.

3. The structure of claim 1 in which said bracket includes a generally C-shaped member having an open end in confronting relation to said motor, a pair of openings in said bracket, a pair of openings in said motor in alignment with said bracket openings, a pair of pins extending parallel to said motor shaft slidingly received in said aligned openings, said extending shaft beng equipped with an axial bore receiving said motor shaft whereby said motor is cantilever-mounted.

4. The structure of claim 1 in which said motor is equipped with inner and outer toothed members arranged to develop a hypocycloidal movement in said inner member.

References Cited in the file of this patent

UNITED STATES PATENTS

| | | |
|---|---|---|
| 2,063,978 | Bollinger | Dec. 15, 1936 |
| 2,083,277 | Scott | June 8, 1937 |
| 2,585,169 | Potter | Feb. 12, 1952 |
| 2,839,208 | Hansen | June 17, 1958 |
| 2,978,238 | Crull | Apr. 4, 1961 |